United States Patent
Yoshikawa

(10) Patent No.: US 7,400,208 B2
(45) Date of Patent: Jul. 15, 2008

(54) TEMPERATURE DETECTOR CIRCUIT AND OSCILLATION FREQUENCY COMPENSATION DEVICE USING THE SAME

(75) Inventor: Rei Yoshikawa, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 11/487,400

(22) Filed: Jul. 17, 2006

(65) Prior Publication Data

US 2007/0030049 A1    Feb. 8, 2007

(30) Foreign Application Priority Data

Jul. 15, 2005  (JP)  ............................. 2005-206581

(51) Int. Cl.
*H01L 35/00* (2006.01)
*G05F 3/16* (2006.01)

(52) U.S. Cl. ...................... 331/176; 327/512

(58) Field of Classification Search ................. 331/176; 327/512
See application file for complete search history.

(56) References Cited

U.S. PATENT DOCUMENTS 7,078,954 B2 *  7/2006  Watanabe ................... 327/512

FOREIGN PATENT DOCUMENTS

| JP | 54-107688 | 8/1979 |
|---|---|---|
| JP | 59-030029 | 2/1984 |
| JP | 03-139873 | 6/1991 |
| JP | 2002-108465 | 4/2002 |

* cited by examiner

*Primary Examiner*—Joseph Chang
(74) *Attorney, Agent, or Firm*—Dickstein Shapiro LLP

(57) ABSTRACT

A temperature detector circuit using a MOS transistor capable of reducing manufacture variation of a mobility and realizing stable output characteristics which are not affected by temperature dependency may be offered. In one example, the temperature detector circuit includes a pair of depression type transistors to output a voltage which is proportional to temperature from a connecting point of a source of a first transistor and a drain of a second transistor. The transistors are the same conducted type of current and are formed in different channel size, which are connected between power supplies in series, and have a configuration in which first transistor's gate and source are connected each other and a first transistor's drain is connected with a second power supply and second transistor's gate and drain are connected each other and a second transistor's source is connected with a first power supply.

11 Claims, 8 Drawing Sheets

TEMPERATURE DETECTOR CIRCUIT AND OSCILLATION FREQUENCY COMPENSATION DEVICE USING THE SAME

BACKGROUND OF THE INVENTION

1. Field of the Invention

The present invention relates to a temperature detector circuit and an oscillation frequency compensation device using it, and more particularly to a MOS-transistor-based temperature detector circuit which has stable output characteristics and an oscillation frequency compensation device including such temperature detector circuit.

2. Discussion of the Background

FIG. 1 illustrates an example of a background temperature detector circuit using a bipolar transistor with commonly connected base and collector. FIG. 2 illustrates an example of a background temperature detector circuit using a Darlington connection of bipolar transistors.

The background temperature detector circuit of FIG. 1 drives the bipolar transistor by a constant current to use a temperature dependency of forward direction voltage for temperature detection. This is of the same kind as a method of using a temperature dependency of forward direction voltage in a so-called PN junction diode. Further, a series connection of two or more of this circuit in FIG. 1 is also known.

In FIG. 2, this circuit has a configuration of Darlington connection with two or more bipolar transistors in order to raise its output sensitivity. This circuit realizes a high sensitivity temperature sensor having two or more Darlington connections and a constant current power supply to the sensor. This kind of circuit may be formed on a single substrate by using a CMOS (complementary metal oxide semiconductor) manufacture process.

FIG. 3 illustrates an example of a background temperature detector circuit having MOS (metal oxide semiconductor) transistors with commonly connected gate and drain in a state of diode connection. The background temperature detector circuit of FIG. 3 uses a temperature dependency of a MOS-transistor threshold for temperature detection. The background temperature detection circuit drives the MOS transistors by a constant current and uses a voltage between the gate and a source for temperature detection.

The temperature dependency of voltage between a gate and a source of a MOS transistor having diode connection is known to change with values of the driving constant current. Specifically, the temperature dependency of threshold is dominantly effective in a minute current domain, resulting in a negative temperature inclination of voltage between the gate and the source. However, the temperature dependency of electron mobility is dominantly effective in a domain above a certain current, resulting in a positive temperature inclination of the voltage.

As illustrated in FIG. 3, the background temperature detection circuit includes a temperature detection section 81, a constant voltage generating section 82, a constant current circuit 832, and a P-type MOS transistor 831. In the temperature detection section 81, a MOS transistor 811 has the diode connection and is driven in a minute current domain to make the temperature dependency of threshold dominantly effective. To increase output sensitivity, the temperature detection section 81 is provided with a plurality of series-connected MOS transistors $812_1$-$812_m$ which have diode connection.

FIG. 4 illustrates an example of a background semiconductor integrated circuit for temperature detection. This circuit includes a first circuit block 97 and a second circuit block 98. The first circuit block 97 generates a reference voltage without temperature dependency. The second circuit block 98 generates an output voltage which has a temperature dependency with a similar configuration to the first circuit block 97. An output Vs1 of the first circuit block 97 and an output Vs2 of the second circuit block 98 may be compared in this circuit. In the first circuit block 97, MOS transistors 912 and 914 having different thresholds form a current mirror circuit which outputs a voltage determined based on a difference between the thresholds of these MOS transistors 912 and 914. In the first circuit block 97, a channel conductance of the MOS transistor 912 and a MOS transistor 913 is made equivalent to a channel conductance of the transistor 914 and a MOS transistor 915. On the other hand, in the second circuit block 98, a channel conductance of MOS transistors 916 and 917 is intentionally made different from a channel conductance of MOS transistors 918 and 919.

Since the output Vs2 of the second circuit block 98 may be a reference voltage with temperature dependency, it can be used as a temperature sensing element. This reference voltage Vs2 is divided so that it can be detected at a predetermined temperature by using resistances 920 and 921 and an operational amplifier 99 that outputs an output voltage Vs3. A comparator 910 compares Vs1 and Vs3 to detect a predetermined temperature, and an output buffer 911 outputs a resultant signal.

SUMMARY OF THE INVENTION

A novel temperature detector circuit and a novel oscillation frequency compensation device using a MOS transistor capable of reducing manufacture variation of a mobility characteristic and realizing stable output characteristics which are not affected by temperature dependency is offered. In one example, the temperature detector circuit includes a pair of depression type transistors to output a voltage which is proportional to temperature from a connecting point of a source of a first transistor and a drain of a second transistor. The transistors are the same conductivity type of current and are formed in different channel size, which are connected between power supplies in series, and have a configuration in which first transistor's gate and source are connected to each other and a first transistor's drain is connected with a second power supply and the second transistor's gate and drain are connected to each other and a second transistor's source is connected with a first power supply.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
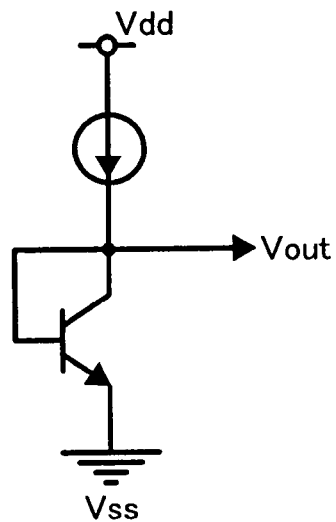
FIG. 1 illustrates an example of a background temperature detector circuit using a bipolar transistor.
Figure 2:
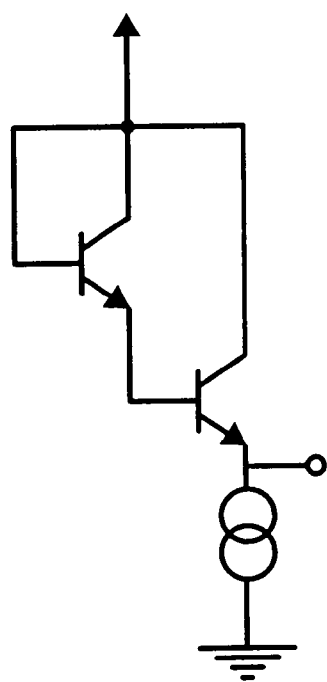
FIG. 2 illustrates an example of a background temperature detector circuit using bipolar transistors with a Darlington connection.
Figure 3:
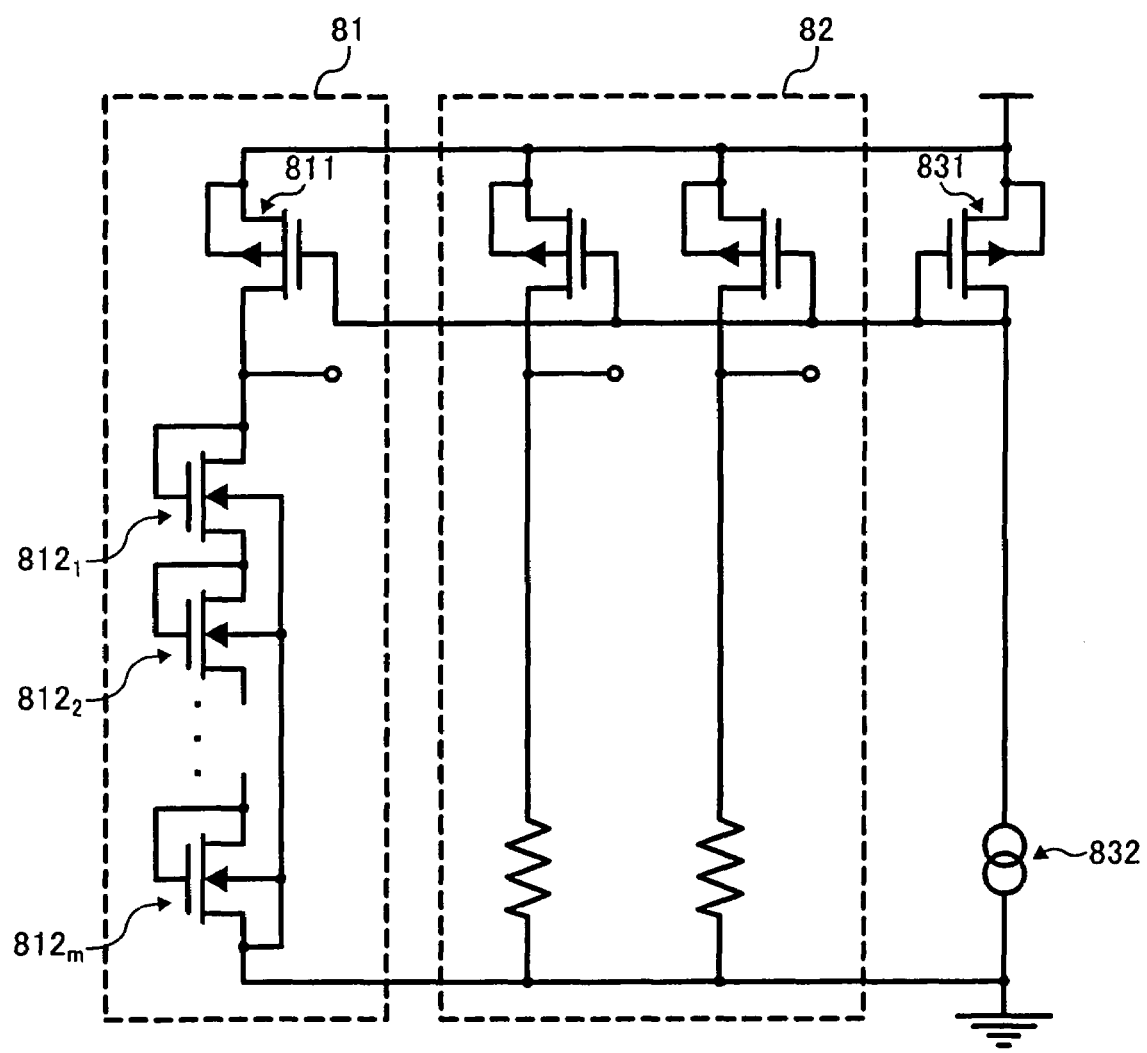
FIG. 3 illustrates an example of a conventional temperature detector circuit including a MOS transistor.
Figure 4:
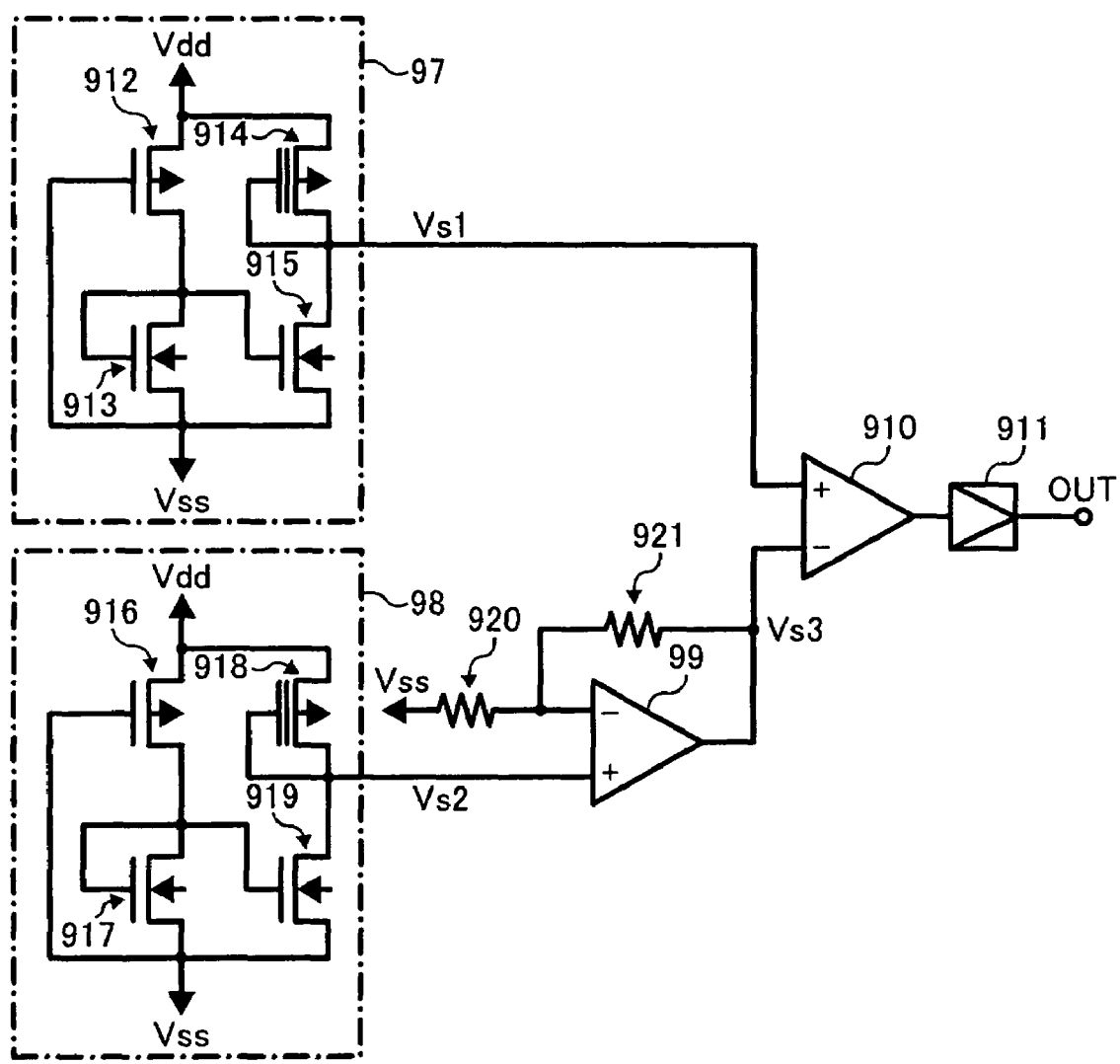
FIG. 4 illustrates an example of a background semiconductor integrated circuit for temperature detection.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, particularly to FIG. 5, an illustration showing a configuration of an embodiment of the present invention as a temperature detector circuit.

Figure 5:
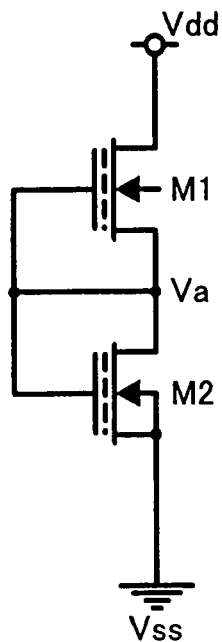
FIG. 5 illustrates an example configuration of a temperature detector circuit according to an example embodiment of the present invention.

FIG. 5 illustrates an example configuration of a temperature detector circuit according to an embodiment of the present invention. Depression type N channel transistors M1 and M2 are connected in series between the second power supply terminal Vdd and the first power supply terminal Vss. A drain of the transistor M1 is connected to the high-voltage terminal Vdd, and a source of the transistor M2 is connected to the low-voltage terminal Vss. The gate and the source of the transistor M1 and the gate and the drain of the transistor M2 have a common connection to output voltage Va. In the above-mentioned configuration, when power supply voltage is high enough, the transistor M1 may operate in a satiety region, and the transistor M2 may operate in a variable resistor domain.

To the voltage Va, currents $I_1$ and $I_2$ which penetrates the transistors M1 and M2, respectively, are sought by the following formulas:

$$I_1 = \frac{1}{2}\mu_n C_{ox} A_1 |V_{t1}|^2; \text{ and}$$

$$I_2 = \mu_n C_{ox} A_2 \left\{(V_a - V_{t2})V_a - \frac{V_a^2}{2}\right\}$$

, where $\mu_n$ is a surface mobility of electron, $C_{ox}$ is a gate capacity per unit area, $A_1$ and $A_2$ are channel width W/channel length L (i.e., an aspect ratio) of the transistors M1 and M2, $V_{t1}$ and $V_{t2}$ are threshold of the transistors M1 and M2. If the formula explaining the output of the temperature sensor include the mobility $\mu_n$ or the gate capacity $C_{ox}$, a calculated value may change with the variations of $\mu_n$ or $C_{ox}$, or output characteristics may be influenced by the change of the mobility $\mu_n$ due to temperature change. It is desirable to eliminate these, if possible, and it is preferable to reduce influences by variations in a process.

In the above-mentioned formulas, a value calculated by multiplying by the mobility $\mu_\square$, the gate capacity $C_{ox}$ per unit area, and the aspect ratios $A_1$ and $A_2$ of a channel is generally called a channel conductance. If the same type transistors (e.g. P-MOS) are formed in adjacent areas on a semiconductor board with the same physical and electric conditions, their element values, such as the mobility $\mu_\square$, the gate capacity $C_{ox}$, and the threshold may be substantially equal in each transistor. Where $I_1 = I_2$, $V_{t2} = -|V_{t1}| = V_{td}$, a next formula holds:

$$V_a = \left(1 - \frac{\sqrt{A_2^2 + A_1 A_2}}{A_2}\right) V_{td},$$

where Vtd is a threshold of a depression type transistor. $A_1$ and $A_2$ are channel width W/channel length L (i.e., an aspect ratio) of the transistors M1 and M2. An inclination of the $A_1$ and $A_2$ may be controlled by adjusting the size. The temperature inclination of Va may be given by a following formula:

$$\frac{dV_a}{dt} = \left(1 - \frac{\sqrt{A_2^2 + A_1 A_2}}{A_2}\right) \frac{dV_{td}}{dt}.$$

An absolute value of output voltage Va and the conditional expression of a temperature inclination are determined only by a threshold and an aspect ratio of a channel of a depression type transistor, and may not be affected by a mobility characteristic.

It is known generally that a temperature inclination of a mobility is nonlinear, and that a temperature inclination of a threshold may be linear of about −1 to −2 mV/° C. As a realistic value, if the aspect ratio of M1 and M2 is 1:8, then the value of output voltage Va may be $|2 \times V_{td}|$ and a temperature inclination may be given by −2 times of the temperature inclination of a same threshold.

It is greatly effective that an output characteristic may be simply set up using the aspect ratio. For example, an output sensitivity may be secured by the Darlington connection etc. using a bipolar transistor in conventional technology, the detection means of this example embodiment simply need to change the aspect ratio of both transistors to secure the output sensitivity. Further, it is not necessary to verify a current domain where a transistor operates at this time.

Thus, in the circuit of this embodiment, since the temperature detector circuit is composed of one kind of depression type transistor, a mobility characteristic may not intervenes when determining an output voltage and output characteristics, just a threshold of the depression type transistor and an accuracy of the ratio may determine the output voltage and the output characteristics. For this reason, there are few elements changed with manufacture variation, and a stable output is obtained. It is not necessary to limit the range of the current value which penetrates the inside of a detector circuit to a specific domain, and a temperature detection means which has high design flexibility may be offered.

FIGS. 6A to 6D illustrate another example configuration of a temperature detector circuit according to an embodiment of the present invention. As for the above-mentioned embodiment, it is ideally desirable for a back gate of the transistor M1 to be Va potential. However, in a CMOS process using P-type substrate base, it generally becomes Vss potential in the example, and errors may be produced in output voltage due to a base bias effect of the transistor M1. In such a case, it may be a configuration that includes current which penetrates the transistor M1 as a current mirror to the transistor M2.

Figure 6A:
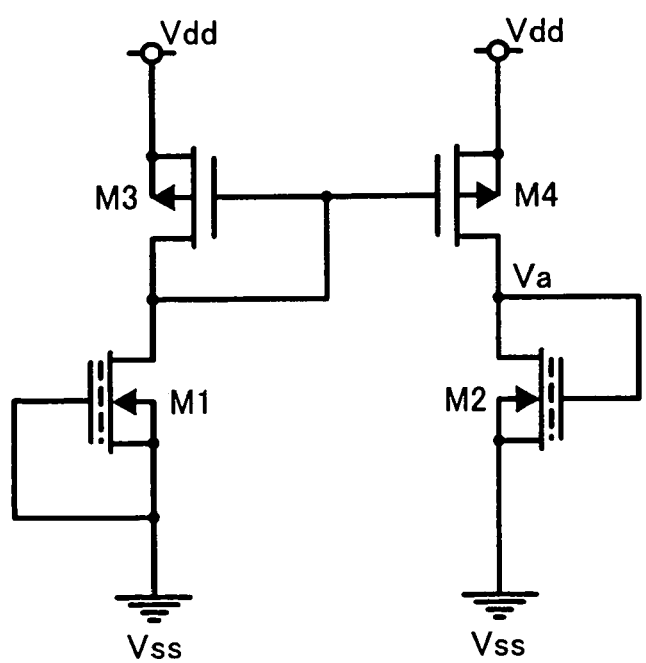
FIG. 6A illustrates an example configuration of a temperature detector circuit according to another example embodiment of the present invention.

An exemplary circuit in FIG. 6A has a configuration including a series connection of a depression type N channel transistor M1 and a P channel transistor M3 between power supplies, a series connection of a depression type N channel transistor M2 and a P channel transistor M4 between power supplies, a gate and a source of the transistor M1 and a source of the M2 to a low power supply terminal Vss, a source of the transistors M3 and M4 which constitute a current mirror to a high power supply terminal Vdd, a gate of the transistors M3 and M4 to a drain of the M3 and M1, and a gate and a drain of the transistor M2 and a drain of the transistor M4 to an output terminal a.

In this example, using a current ratio of a current mirror enables set up an output voltage and a temperature inclination without using an aspect ratio of a channel like the former example.

For example, if aspect ratios of the transistors M1 and M2 are in equal and a current ratio is 1:α, then next formula about an output voltage Va holds:

$$V_a = (1 - \sqrt{1+\alpha})V_{td}$$

Further, a temperature inclination of Va is given by a following formula:

$$\frac{dV_a}{dt} = (1 - \sqrt{1+\alpha})\frac{dV_{td}}{dt}.$$

An output voltage Va and output characteristics are determined only by a threshold and an aspect ratio of a channel of a depression type transistor, and may not be affected by a mobility characteristic.

According to this example, although the number of elements and current paths of a detection means increase, it may respond even if a base bias effect influences, and it enables set up an output voltage and output characteristics using a ratio of a current mirror or an aspect ratio of a channel.

In this example, a function of the current mirror is produced by only using the transistors M3 and M4. In the circuit in FIG. 6A, the voltage between source-drains of both transistors is not in agreement in many power-supply-voltage conditions, and there is a problem that a current ratio of the current mirror is not reproduced correctly. In this case, output voltage may separate from a theoretical formula, or may include power-supply-voltage dependability. When using this example embodiment in a wide power-supply-voltage range, it is effective to change the configuration of a current mirror into circuits shown in FIGS. 6B to 6D.

Figure 6B:
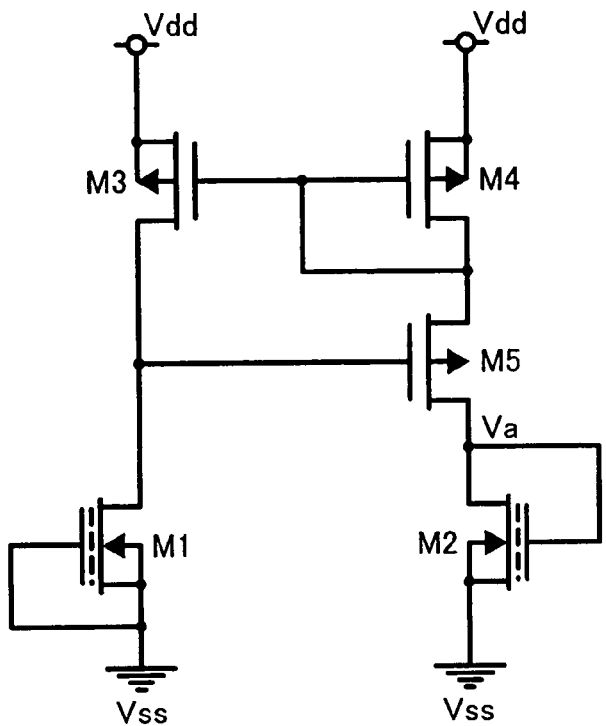
FIG. 6B illustrates an example configuration of a temperature detector circuit including a Wilson current mirror circuit according to another example embodiment of the present invention.

FIG. 6B illustrates a configuration of a temperature detector circuit which includes a Wilson current mirror circuit. It is realizable only by adding one P channel transistor M5 to the circuit in FIG. 6A. A threshold of the transistor M5 may cause a little gap to remain in the voltage between source-drains of transistors M3 and M4, a slight error may occur in output voltage, and the minimum operation voltage may rise by the threshold of the P channel transistor.

Figure 6C:
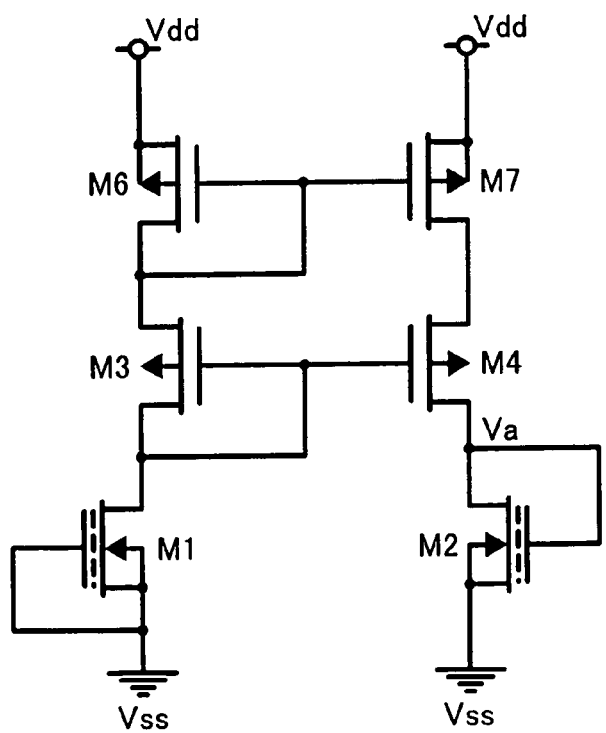
FIG. 6C illustrates an example configuration of a temperature detector circuit including a cascode current mirror circuit according to another example embodiment of the present invention.

FIG. 6C illustrates a configuration of a temperature detector circuit which includes a cascode current mirror circuit. In this circuit, a P channel transistor M6 is connected between a transistor M3 and a high power supply terminal Vdd, and a P channel transistors M7 is connected between a transistor M4 and the high power supply terminal Vdd, and a common connection of a gate of M6 and M7 is connected with a source terminal of the transistor M3. According to this circuit, since the voltage between source-drains in the transistor pair of right and left of a current mirror circuit is kept in high accuracy, a current ratio may be reproduced correctly and the accuracy of the output voltage may improve. However, the rise of the minimum operation voltage is the same level in FIG. 6B.

Figure 6D:
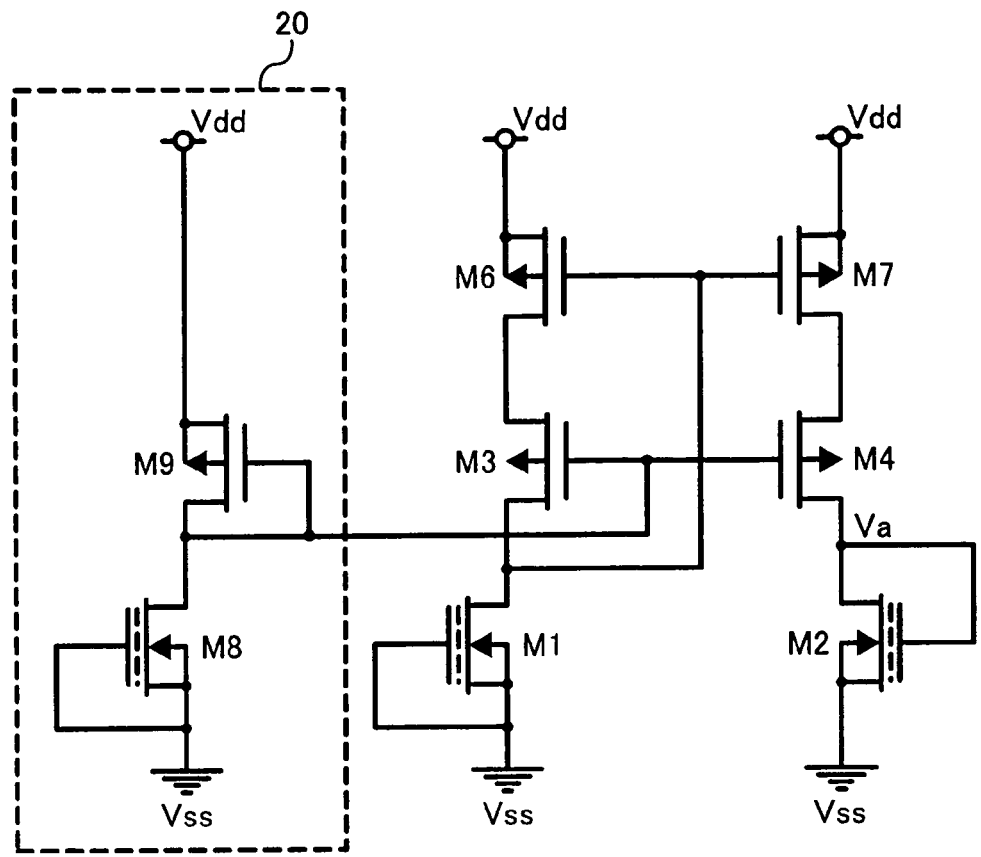
FIG. 6D illustrates an example configuration of a temperature detector circuit including a cascode current mirror circuit corresponding to a low-voltage operation according to another example embodiment of the present invention.

FIG. 6D illustrates a configuration of a temperature detector circuit which includes a cascode current mirror circuit corresponding to low-voltage operation. A common connection of a gate of transistors M6 and M7 is connected with a drain terminal of a transistor M3. A constant voltage generated in another circuit such as a circuit 20 shown in this FIG. 6D is input into gates of transistors M3 and M4. According to this example, a current ratio may be kept in high accuracy in a wide power-supply-voltage range, and a rise of the minimum operation voltage may also be controlled.

Figure 7:
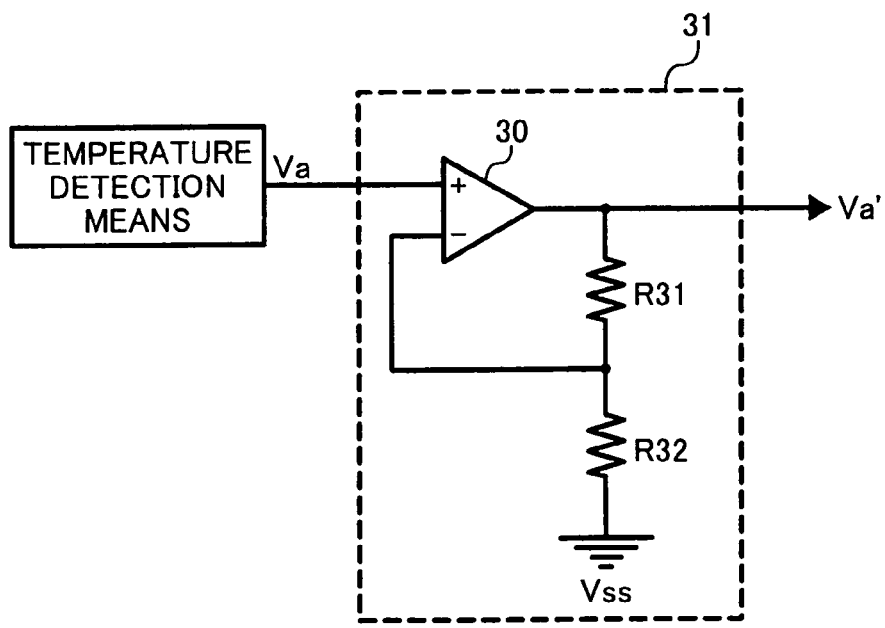
FIG. 7 illustrates an example configuration of a temperature detector circuit according to another example embodiment of the present invention.

FIG. 7 illustrates another example configuration of a temperature detector circuit according to an embodiment of the present invention. This example amplifies an output signal of the temperature detection means in former examples using an amplification circuit 31 which includes resistors R31 and R32 and an operational amplifier 30 so as to raise an output sensitivity to temperature. In former examples, since the temperature detection means may set up output sensitivity by using an aspect ratio of a channel, arbitrary sensitivity setup may be possible theoretically. However, a setup of an extreme aspect ratio may cause the influence of a processing accuracy in a manufacturing process to be imbalanced between transistors, and an assumed characteristic may not be acquired.

In such a case, an output sensitivity at the rate of amplification set up by resistance may be realized by using the circuit of this example which set up the aspect ratio of a temperature detection means as a suitable value.

For example, if a large aspect ratio of the channel is taken as 1:100 in former examples in FIGS. 6A to 6D, sensitivity may increase about 9 times as converted value as a threshold, but accuracy may fall. For this reason, using the circuit in FIG. 7, controlling the rate of amplification of the temperature detection means as twice (i.e. 1:8 as an aspect ratio), the amplification circuit 31 may amplify 4.5 times.

The circuit shown in FIG. 7 may have a configuration with a variable resistor or a trimming means as a part of resistance, and that adjusts the rate of amplification.

Otherwise, it is also possible to change the connection place of R32 in giving DC-offset as fixed potential other than Vss or in combining the known addition circuit.

Figure 8A:
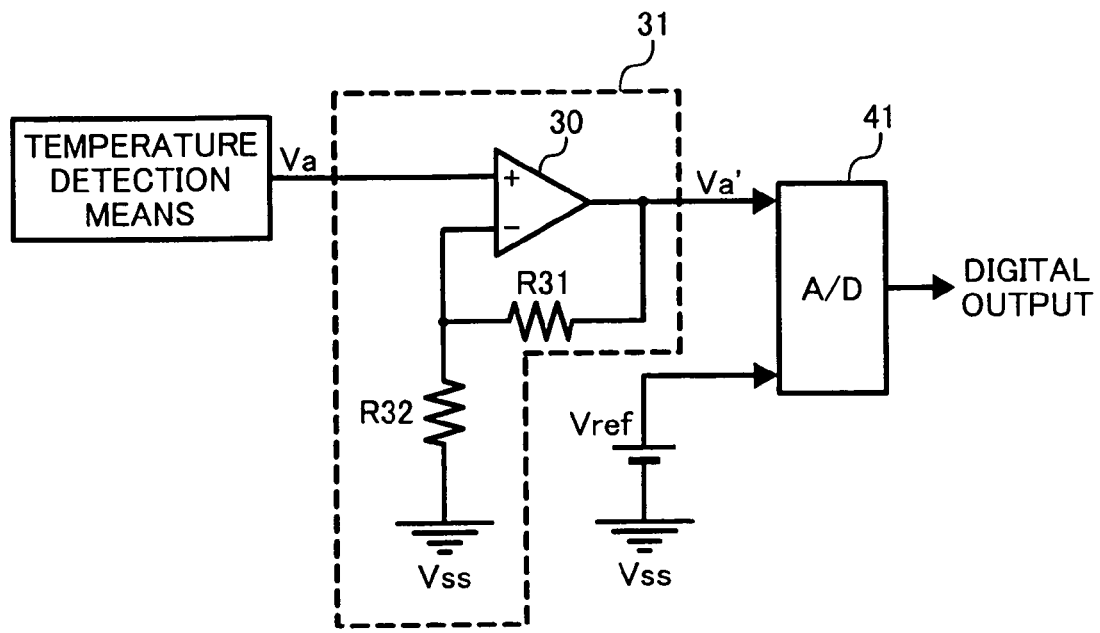
FIG. 8A illustrates an example configuration of a temperature detector circuit according to another example embodiment of the present invention.
Figure 8B:
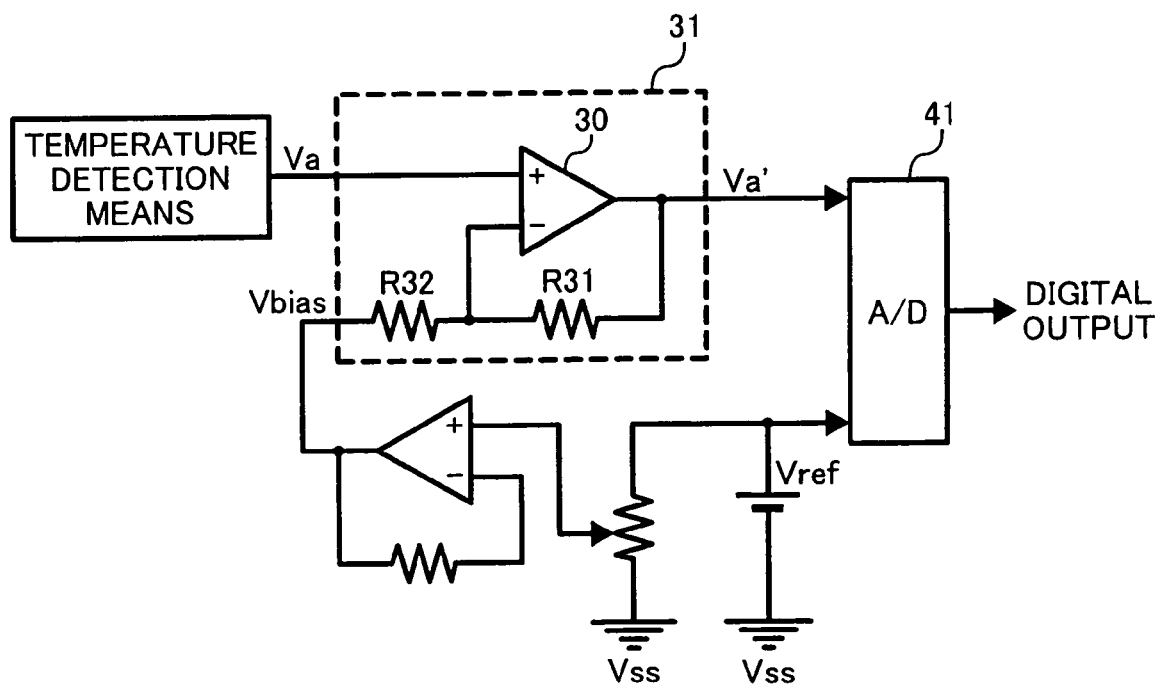
FIG. 8B illustrates an example configuration of a temperature detector circuit according to another example embodiment of the present invention.

FIG. 8A illustrates another example configuration of a temperature detector circuit according to an embodiment of the present invention. FIG. 8B also illustrates another example configuration of a temperature detector circuit as an application of the example in FIG. 8A. The example in FIG. 8A is the temperature detector circuit including the temperature detection means of former example which has output voltage Va' and the reference voltage Vref prepared independently, comparing both outputs Va' and Vref through an A/D converter 41, and outputting the comparing result as digital data. In this example, the input reference voltage Vref may be, for example, voltage generated using a well-known reference voltage generating circuit, or a fixed potential provided physically. Further, when the reference voltage has a little temperature dependency, it may increase the rate of amplification of the circuit means which includes a configuration of former example in FIG. 7 according to the accuracy of the reference voltage, and errors due to the temperature dependency of the reference voltage Vref may be set as the level which does not cause a problem substantially.

For example, when using a depression type transistor which has a condition that $V_{td}$=−0.3 V and the temperature dependency of a threshold is −1.2 mV/° C. setting about 4 times of output sensitivity, an output value Va' may be about 1.2 V, and a temperature inclination may be 4.8 mV/° C.=4000 ppm/° C. in normal temperature. When comparing the reference voltage which has a range of ±100 ppm/°C. fluctuation with this, it may be a calculation which changes from normal temperature to ±40° C. with an error of 1° C.

Further, when having a configuration in FIG. 8B, a next formula holds:

$$V'_a = \frac{R31 + R32}{R32} V_a - \frac{R31}{R32} V_{bias}.$$

Therefore, it may be possible to increase only a temperature inclination without changing an output value in normal temperature, for example, it may also be possible for ±80° C. change with an error of 1° C. at 8000 ppm/° C. Although Vbias in FIG. 8B may be a form of a buffer output here, it also may be given with a regulator output or a fixed power supply, and it may be used together with other addition circuits.

Figure 9:
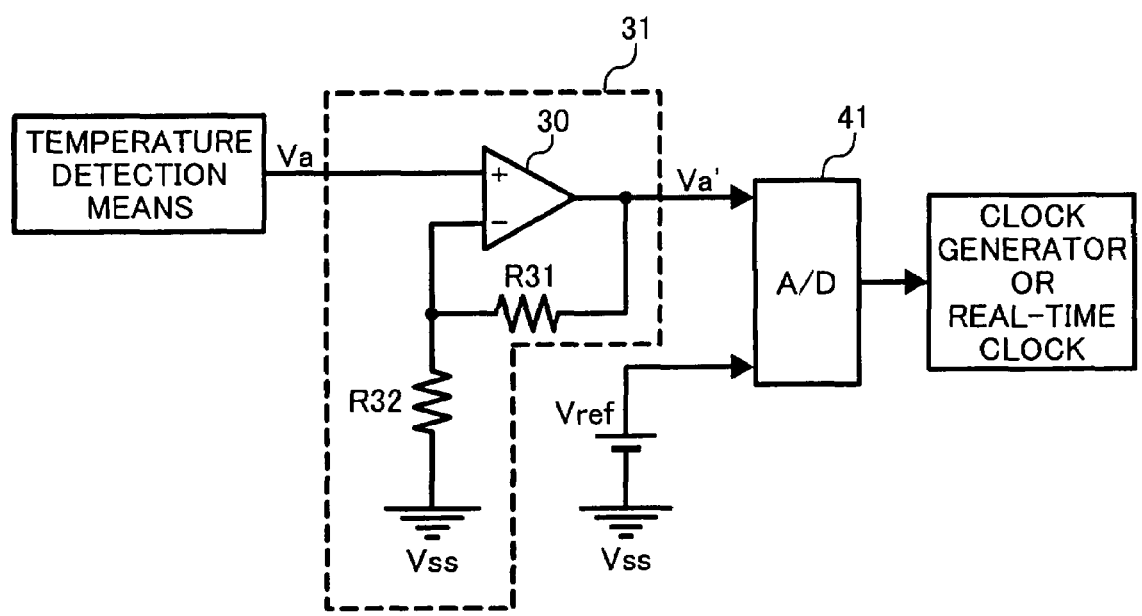
FIG. 9 illustrates a configuration of a clock generator or a real-time clock which includes the temperature detector circuit of FIGS. 8A and 8B.

FIG. 9 illustrates a configuration of a clock generator or a real-time clock which includes a temperature detector circuit of a former example in FIGS. 8A and 8B. This example is a clock generator or a real-time clock equipped with a means which compensates oscillation frequency using a digital output of the temperature detector circuit in FIGS. 8A and 8B. It is known that oscillation frequency of a clock generator or a real-time clock using a piezoelectric vibrator may be fluctuated based on temperature.

As a general method of rectifying this oscillation frequency, there is a method in which oscillation capacity is changed according to acquired temperature information with a temperature detector circuit, in addition, there is another method in which time information is compensated with adjusting frequency divider. In a real-time clock, since it may be driven full-time in a equipment, it is important that it has low consumption current. The temperature detector circuit in FIGS. 8A and 8B uses MOS transistors which run in low consumption current. Thus, when using a configuration of this embodiment in a real-time clock and a clock generator equipped with a correction means for temperature, whole consumption current may be controlled in low.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application, No. JPAP2005-206581 filed on Jul. 15, 2005 in the Japan Patent Office, the entire contents of which are incorporated by reference herein.

What is claimed is:

1. A temperature detector circuit, comprising:
  a first transistor having a gate and a source connected to each other and a drain connected to a second power source, the first transistor being a depression type transistor; and
  a second transistor having a gate and a drain connected to each other and a source connected to a first power source, and connected in series to the first transistor between the first and second power source such that the source of the first transistor is connected to the drain of the second transistor at a connection point, and configured to output a voltage in proportion to a temperature from the connection point, the second transistor being a depression type transistor with a same conductivity type and a different channel size relative to the first transistor.

2. The temperature detector circuit of claim 1, wherein a voltage of the second power source is higher than a voltage of the first power source.

3. A temperature detector circuit, comprising:
  a first transistor having a gate and a source connected to each other and a drain connected to a drain of a second transistor, and the source of the first transistor connected to a first power source, the first transistor being a depression type transistor;
  a third transistor having a gate and a drain connected to each other and a source connected to the first power source, and the drain connected to a drain of a fourth transistor, the third transistor being a depression type transistor with a same conductivity type and a different channel size relative to the first transistor;
  the second transistor having a gate and a drain connected to each other and a source connected to a second power source, the second transistor being a different conductivity type relative to the first transistor; and
  a fourth transistor having a gate connected to the gate of the second transistor, a source connected to the second power source, and configured to output a voltage in proportion to a temperature from the drain, the fourth transistor being a different conductivity type relative to the first transistor.

4. The temperature detector circuit of claim 1, further comprising:
  an amplification circuit amplifying an output signal of the output voltage proportional to temperature,
  wherein the amplification circuit includes:
    an operational amplifier to output a signal arbitrarily amplified, and
    a resistor.

5. The temperature detector circuit of claim 4, further comprising:
  an A/D converter comparing an output signal of the amplification circuit with a reference voltage apart from the output signal to output temperature information as digital data.

6. An oscillation frequency compensation device compensating the oscillation frequency with temperature information output from an A/D converter comprising:
  a temperature detector circuit;
  an amplification circuit amplifying an output signal of the voltage proportional to temperature; and
  an A/D converter comparing an output signal of the amplification circuit with a reference voltage apart from the output signal to output temperature information as digital data;
  wherein the temperature detector circuit includes:
    a first transistor having a gate and a source connected to each other and a drain connected to a first power source, the first transistor being a depression type transistor, and
    a second transistor having a gate and a drain connected to each other and a source connected to a second power source, and connected in series to the first transistor between the first and second power source such that the source of the first transistor is connected to the drain of the second transistor at a connection point, and configured to output a voltage in proportion to a temperature from the connection point, the second transistor being a depression type transistor with a same conductivity type and a different channel size relative to the first transistor, the amplification circuit including:
an operation amplifier to output a signal arbitrarily amplified, and
a resistor.

7. A temperature detector circuit, comprising:
a first transistor having a gate and a source connected to each other and a drain connected to a drain of a second transistor, and the source connected to a first power source, the first transistor being a depression type transistor;
a third transistor having a gate and a drain connected to each other and a source connected to the first power source, and the drain connected to a drain of fourth transistor, the third transistor being a depression type transistor with a same conductivity type and a different channel size relative to the first transistor;
a second transistor having a gate connected to a gate of a fifth transistor and a source connected to a second power source, the second transistor being a different conductivity type relative to the first transistor;
a fifth transistor having a gate and a drain connected to each other and a source connected to the second power source, the fifth transistor being a different conductivity type relative to the first transistor; and
a fourth transistor having a gate connected to the drain of the third transistor, a source connected to the drain of the fifth transistor, and configured to output a voltage in proportion to a temperature from the drain, the fourth transistor being a different conductivity type relative to the first transistor.

8. A temperature detector circuit, comprising:
a first transistor having a gate and a source connected to each other and a drain connected to a drain of a second transistor, and the source connected to a first power source, the first transistor being a depression type transistor;
a third transistor having a gate and a drain connected to each other and a source connected to the first power source, and the drain connected to a drain of a fourth transistor, the third transistor being a depression type transistor with a same conductivity type and a different channel size relative to the first transistor;
the second transistor having a gate and a drain connected to each other and a source connected to a drain of a fifth transistor, the second transistor being a different conductivity type relative to the first transistor;
the fourth transistor having a gate connected to the gate of the second transistor, a source connected to a drain of a sixth transistor, and configured to output a voltage in proportion to a temperature from the drain, the fourth transistor being a different conductivity type relative to the first transistor;
the fifth transistor having a gate and a drain connected to each other and a source connected to a second power source, the fifth transistor being a different conductivity type relative to the first transistor; and
the sixth transistor having a gate connected to the gate of the fifth transistor and a source connected to the second power source, the sixth transistor being a different conductivity type relative to the first transistor.

9. A temperature detector circuit, comprising:
a first transistor having a gate and a source connected to each other and a drain connected to a drain of a second transistor and a gate of a third transistor, and the source connected to a first power source, the first transistor being a depression type transistor;
a fourth transistor having a gate and a drain connected to each other and a source connected to the first power source, and the drain connected to a drain of a fifth transistor, the second transistor being a depression type transistor with a same conductivity type and a different channel size relative to the first transistor;
the second transistor having a gate connected to a constant voltage power source and a source connected to a drain of the third transistor, the second transistor being a different conductivity type relative to the first transistor;
the fifth transistor having a gate connected to the gate of the second transistor, a source connected to a drain of a sixth transistor, and configured to output a voltage in proportion to a temperature from the drain, the fifth transistor being a different conductivity type relative to the first transistor;
the third transistor having a source connected to a second power source, the third transistor being a different conductivity type relative to the first transistor; and
the sixth transistor having a gate connected to the gate of the third transistor and a source connected to the second power source, the sixth transistor being a different conductivity type relative to the first transistor.

10. The temperature detector circuit of claim 1,
wherein when the first transistor operates in a satiety region and the second transistor operates in a variable resistor domain, currents $I_1$ and $I_2$ which penetrate the first transistor and the second transistor, respectively, and the output voltage Va proportional to temperature are expressed in following three formulas:

$$I_1 = \frac{1}{2}\mu_n C_{ox} A_1 |V_{tl}|^2$$

$$I_2 = \mu_n C_{ox} A_2 \left\{ (V_a - V_{t2})V_a - \frac{V_a^2}{2} \right\}$$

$$V_a = \left( 1 - \frac{\sqrt{A_2^2 + A_1 A_2}}{A_2} \right) V_{td}.$$

11. The temperature detector circuit of claim 5, further comprising:
a bias voltage generating circuit applying a bias voltage $V_{bias}$ to a negative input terminal of the operational amplifier of the amplification circuit through return first and second resistors, wherein an input voltage Va' to the A/D converter is expressed in following formula:

$$V_a' = \frac{R31 + R32}{R32} V_a - \frac{R31}{R32} V_{bias}$$

wherein R31 is the resistance of the first resistor and R32 is the resistance of the second resistor.

* * * * *